US010615865B2

United States Patent
Waldhauer, Jr.

(10) Patent No.: US 10,615,865 B2
(45) Date of Patent: Apr. 7, 2020

(54) SATELLITE REPEATER SYSTEM AND RELATED METHODS

(71) Applicant: Crowley Liner Services, Inc., Jacksonville, FL (US)

(72) Inventor: David H. Waldhauer, Jr., Jacksonville, FL (US)

(73) Assignee: Crowley Liner Services, Inc., Jacksonville, FL (US)

( * ) Notice: Subject to any disclaimer, the term of this patent is extended or adjusted under 35 U.S.C. 154(b) by 0 days.

(21) Appl. No.: 15/961,051

(22) Filed: Apr. 24, 2018

(65) Prior Publication Data
US 2019/0326980 A1    Oct. 24, 2019

(51) Int. Cl.
*H04B 7/185* (2006.01)
(52) U.S. Cl.
CPC .................. *H04B 7/1851* (2013.01)
(58) Field of Classification Search
CPC .............. H04B 7/1851; H04B 7/18508; H04B 7/18521; H04B 7/18523; H04B 7/18576
USPC .......................................... 455/7, 12.1, 11.1
See application file for complete search history.

(56) References Cited

U.S. PATENT DOCUMENTS

| 5,086,499 | A | * | 2/1992 | Mutone | G05B 9/03 714/10 |
| 8,416,147 | B2 | * | 4/2013 | Martch | H01Q 1/005 343/878 |
| 2004/0174259 | A1 | * | 9/2004 | Peel | G07C 5/008 340/539.26 |
| 2007/0115859 | A1 | * | 5/2007 | Meyers | G06Q 10/08 370/254 |
| 2010/0272609 | A1 | * | 10/2010 | Haas | G01N 21/8483 422/82.05 |
| 2011/0193710 | A1 | * | 8/2011 | McIlvain | B60P 3/20 340/585 |

* cited by examiner

Primary Examiner — Sonny Trinh
(74) Attorney, Agent, or Firm — Venable LLP; Michele V. Frank

(57) ABSTRACT

A satellite repeater system for a ship or barge includes a rack having dimensions that are substantially equal to a standard shipping container; and a satellite communication system located on the rack. The satellite communication system includes a first antenna located on the rack, the first antenna being configured to send and receive data from a communication satellite; and a second antenna located on the rack, the second antenna being configured to send and receive data from one or more electronic components located on the ship or barge remotely from the second antenna.

20 Claims, 13 Drawing Sheets

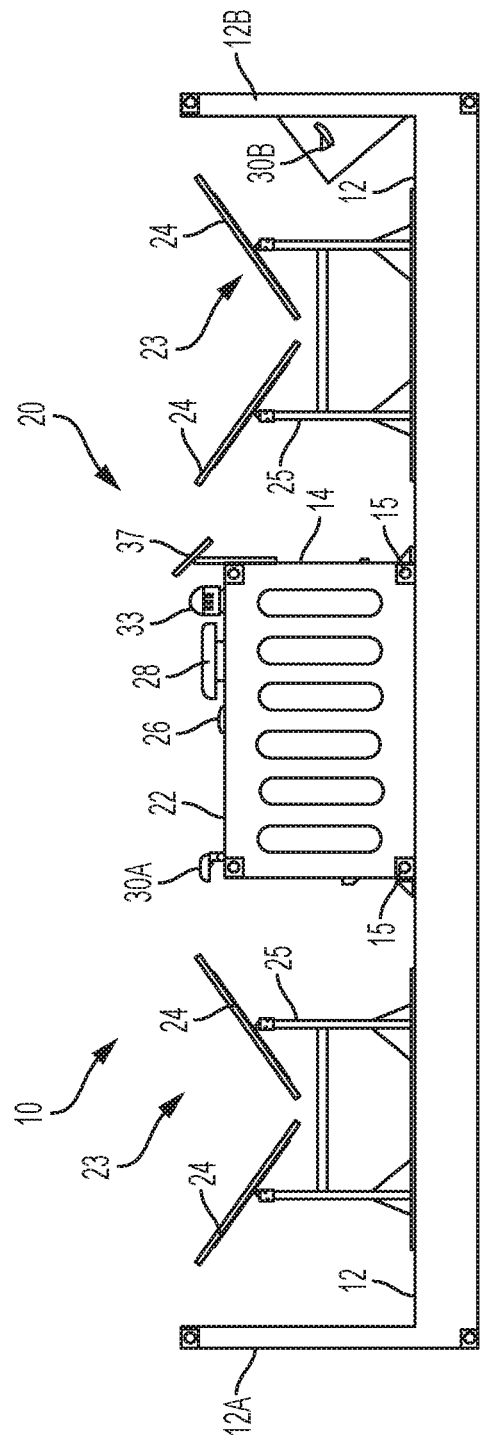
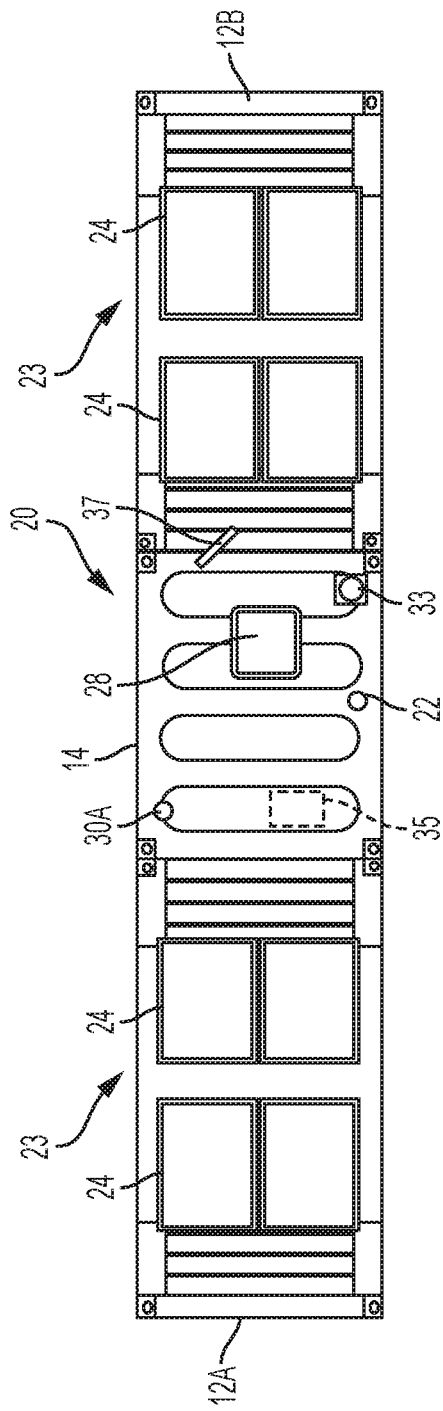
FIG. 2A
FIG. 2B

SATELLITE REPEATER SYSTEM AND RELATED METHODS

FIELD

The present invention relates to communication systems, and in particular, to a satellite repeater system for vessels.

INTRODUCTION

Shipping containers often are used to transport goods on ships. For example, shipping containers (e.g., refrigerated shipping containers) can be transported on a top deck of a multi-deck Roll-on/Roll-off (RoRo) barge or ship. RoRo ships or barges are vessels designed to carry wheeled cargo (e.g., cars, trucks, trailers, etc.) that are driven on and off the ship on their own wheels or using a platform vehicle or transporter. The top deck of a RoRo can also be used to carry shipping containers (e.g., refrigerated shipping containers).

In the case of refrigerated shipping containers, the shipping containers are supplied with electrical power so as to cool the interior of the refrigerated shipping containers. The refrigerated shipping containers are powered by an unmanned system referred to as a "power pack." A typical power pack includes an Inmarsat communication system, which provides data services through communication with ground stations via communication geostationary satellites. The Inmarsat digital message service system is used to monitor a variety of parameters of the shipping container using sensors to determine any change in the operational state of the shipping container.

When a refrigerated shipping container is loaded onboard of a cargo ship and the cargo ship is out of range of the on-shore cellular network, the shipping container uses a communication system to communicate data from the parameters measured by the sensors with a WAM server provided in the cargo ship using a local cellular system (similar to a local area network WiFi). The WAM server on the cargo ship in turn communicates the data to the on-shore WAM system via the internet through an Inmarsat Fleet Broadband Satellite (IFBS) system that is part of the cargo ship's communications system or other satellite based communication system such as Fleet Broadband (Fleet One).

This type of communication system can be well suited for a RoRo cargo ship where the shipping container is placed on the top deck and there is a direct line of sight from the communication system installed on the shipping container to a satellite. However, other types of cargo ships can be used. For example, on a Lift-on/Lift-off (LoLo) ship where on-board cranes or dockside cranes are used to load and unload cargo, the shipping containers are stacked on top of each other to two levels or more (often up to five or six levels) thus forming a wall that is two or more stories high. The power packs are typically placed directly on the deck and are not stacked on top of other shipping containers or on top of each other. Therefore, the power packs can be surrounded by relatively high walls of steel formed by the stacked shipping containers. As a result, Inmarsat communication systems can be located in "steel canyons" wherein the power packs can be surrounded by the two or more story high steel walls. For example, a "steel canyon" is often formed that is three shipping containers long, one shipping container wide, and three or more shipping containers high. In this situation, the communication systems (e.g., an antenna of the communication systems) in the power packs will not have a direct line of sight with a satellite or unrestricted view of the sky in the direction and elevation of the satellite and thus would not be able to send data. The communication path between the communication system on the power pack and the satellite is obstructed by the high walls formed by the surrounding shipping containers. In the event that a malfunction occurs in the operational state of the shipping container, the power packs would not be able to reliably communicate with the satellite and cannot generate an alert.

Furthermore, in LoLo ships, wherein shipping containers are stacked on top of each other, there is often no appropriate safe location on the ship to place a WAM communication system and power it, and there is often no appropriate location on the ship to install an Inmarsat Fleet One communication system where the antenna of the Inmarsat Fleet One is able to "see" the satellite.

Therefore, a need remains for a communication system that provides communication between a shipping container and a satellite that solves the above and other problems of existing communication systems.

SUMMARY

It was determined that by using the satellite repeater system of the present disclosure it is possible to more reliably achieve data communication between a shipping container power pack and/or a shipping container and a satellite. These and other benefits of the present communication system will be further appreciated in the following paragraphs.

An aspect of the present disclosure is to provide a satellite repeater system for a ship or barge. The satellite repeater includes a rack having dimensions that are substantially equal to a standard shipping container; and a satellite communication system located on the rack. The satellite communication system includes a first antenna located on the rack, the first antenna being configured to send and receive data from a communication satellite; and a second antenna located on the rack, the second antenna being configured to send and receive data from one or more electronic components located on the ship or barge remotely from the second antenna.

Another aspect of the present disclosure is to provide a ship or barge including a plurality of shipping containers located on the ship or barge; at least one power pack associated with one or more of the plurality of shipping containers; and a satellite repeater system located on the ship or barge. The satellite repeater system includes a first antenna being configured to send and receive data from a communication satellite, and a second antenna being configured to send and receive data from the at least one power pack.

Another aspect of the present disclosure is to provide a method of communicating between a satellite and one or more electrical components located on a ship or barge. The method includes transmitting data between a first antenna located on a rack having dimensions that are substantially equal to a standard shipping container and a communication satellite, the rack being located on a ship or barge; transmitting the data between a second antenna located on the rack and one or more electronic components located on the ship or barge remotely from the second antenna; and transmitting the data between the first antenna and the second antenna.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 2A is a side view of a satellite repeater platform, according to an embodiment of the present disclosure;

FIG. 2B is a top view of the satellite repeater platform, according to an embodiment of the present disclosure;

DETAILED DESCRIPTION

Figure 1:
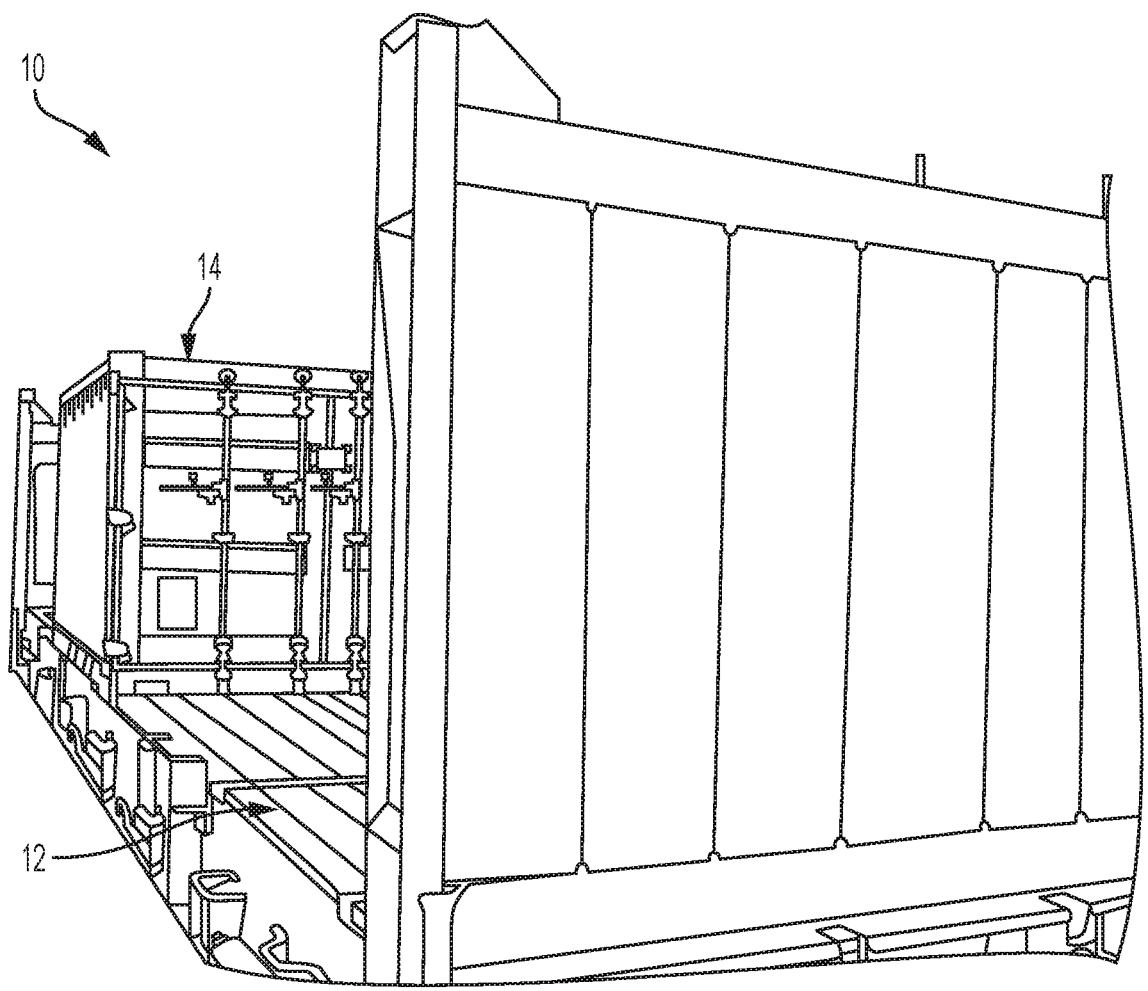
FIG. 1 is a three-dimensional perspective view of a rack of a satellite repeater platform (SRP), according to an embodiment of the present disclosure.

FIG. 1 is a three-dimensional perspective view of a rack 10 for a satellite repeater platform, according to an embodiment of the present disclosure. The rack 10 can include a skid 12 and a housing 14 located on the skid 12. In an embodiment, the rack 10 can comprise a "flat rack," the majority of which has a flat upper surface. The rack 12 can include two end walls 12A and 12B projecting upwards from the skid 12 (see FIGS. 2A and 2B). The rack 10 can have the footprint of a conventional shipping container. In an embodiment, a length of the rack 10 is equal to a length of a standard shipping container, such as a standard International Standard Organization (ISO) container, between about 10 feet and about 60 feet, for example, 20 feet, 40 feet, 45 feet, or 53 feet. In an embodiment, a width of the rack 10 is equal to a width of a standard shipping container, e.g., a standard ISO shipping container, between about 4 feet and about 16 feet, for example, 8 feet. In an embodiment, a height of the rack 10 (e.g., as defined by the height of the end walls 12A, 12B) is equal to a height of a standard shipping container, e.g., a standard ISO shipping container, between about 5 feet and about 20 feet, for example, 8 feet and 6 inches or 9 feet and 6 inches. By selecting the dimensions of the rack 10 to be substantially equal to the dimensions of a standard ISO shipping container, the rack 10 can fit in a geometrical arrangement of shipping containers on a ship, such as a RoRo or LoLo. The housing 14 located on the rack 10 can have the dimensions of a smaller shipping container (e.g., a length equal to about 10 feet, a width equal to about 8 feet, and height equal to about 6 feet, however other dimensions are possible). By selecting the dimensions of a smaller shipping container for the housing 14, the housing 14 can fit within the envelope of the rack 10. In an embodiment, the rack 10 and housing 14 are constructed using metal and/or wood and/or other composite materials.

FIG. 2A is a side view of a satellite repeater platform 20, according to an embodiment of the present disclosure. The satellite repeater platform 20 acts as a relay between a satellite and one or more power packs. The one or more power packs are used to supply power to refrigerated shipping containers. A power pack can have two electrical generators and an automatic load switch. One electrical generator is assigned to be the primary electrical generator, and the other electrical generator can be a backup electrical generator in case of a malfunction of the primary electrical generator. Should a problem arise with the primary electrical generator, the primary electrical generator is shut down and the backup electrical generator can be turned on and the load switched to the backup electrical generator. The shipping container can also be provided with a shipping container monitoring system to monitor a variety of parameters of the shipping container using sensors to determine any change in the operational state of the shipping container. Any changes in the parameters can be transmitted to a provider and appropriate alerts are provided to maintenance and management personnel. The parameters can include, for example, temperature, location, etc. According to an embodiment, the status of each shipping container (asset) is displayed on a secure web site.

The satellite repeater platform 20 can receive a signal carrying data (e.g., temperature data, humidity data, inside the one or more shipping containers) from the one or more shipping container monitoring systems (including one or more temperature sensor, humidity sensor, $CO_2$ sensor, etc.) and relays the data to the satellite which can then transmit the data to a terrestrial base station. Similarly, the base station can send signals (e.g. command signals such as a temperature adjustment signal) to the satellite which in turn transmits the signal to the satellite repeater platform 20 which relays the signal to the one or more shipping containers (for example, to adjust the temperature inside the one or more shipping containers).

The satellite repeater platform 20 can also receive a signal carrying data (e.g., voltage data, current data, power output data, etc.) from the one or more power packs and relays the data to the satellite which can then transmit the data to a terrestrial base station. Similarly, the base station can send signals (e.g. command signals such as a voltage adjustment signal) to the satellite which in turn transmits the signal to the satellite repeater platform 20 which relays the signal to the one or more power packs (for example, to adjust the voltage or power output of the one or more power packs).

The satellite repeater platform 20 includes the rack 10. The satellite repeater platform 20 also includes a satellite repeater 22 and a power supply 23 (e.g., including one or more solar panels 24) that provide electrical power to the satellite repeater 22. This can be done, for example, by electrical cables (not shown) between the power supply 23 and the satellite repeater 22. In another embodiment, the power supply 23 can include a stack of chargeable batteries that can be charged using the solar panels 24 or using electricity generated by the vessel's engine, for example. Parts of the satellite repeater 22 are housed in housing 14 provided on skid 12 of the rack 10. In an embodiment, the housing 14 is mounted to the skid 12 and attached to the skid 12 using tie-downs 15, however, other methods of attachment are possible. In an embodiment, the solar panels 24 are mounted to the skid 12 using frames 25, however, again, other methods of attachment are possible. In an embodiment, the solar panels 24 can be mounted to frames 25 using hinges to allow pivoting of the panels and thus orienting the solar panels 24 towards the direction of the sun. For example, in an embodiment, the frame 25 supporting the solar panels 24 can be mounted to a pole via a mounting sleeve with one or more pivot points to allow orienting the solar panels 24 with multiple degrees of freedom, supplied by DPW SOLAR Corporation.

FIG. 2B is a top view of the satellite repeater platform 20, according to an embodiment of the present disclosure. As further shown in FIG. 2B, in an embodiment, the satellite repeater platform 20 includes a power supply 23 (e.g., including solar panels 24) and satellite repeater 22, parts of which are contained within housing 14. As shown in FIGS. 2A and 2B, the housing 14 is positioned substantially at the middle of the rack 10 and the solar panels 24 are placed on each side of the housing 14. This configuration provides a weight balance for the satellite repeater platform 20. However, it is also contemplated that the housing 14 be placed at other positions on the rack 10, for example on the left side or right side of the rack and the solar panels 24 placed on the opposite side. Additionally, embodiments can omit the housing 14.

As shown in FIGS. 2A and 2B, the satellite repeater 22 further includes an outdoor satellite antenna 30A and an indoor antenna 30B. The outdoor satellite antenna 30A includes a satellite uplink/downlink "roof" antenna. The indoor antenna 30B includes a wall uplink/downlink antenna. The outdoor satellite antenna 30A is configured for uplink and downlink communication data with a satellite. The indoor antenna 30B is configured for data communication with one or more components on the same vessel as the indoor antenna 30B. The satellite repeater 22 also includes a FleetOne Inmarsat satellite communication system Above Deck Equipment (ADE) 33 (e.g., COBHAM SAILOR antenna) and Fleet One Inmarsat satellite communication system Below Deck Equipment (BDE) 35 (e.g., COBHAM SAILOR terminal). WAM Fleet One ADE 33 is positioned above deck, for example, on the top wall of the housing 14. WAM Fleet One BDE 35 is provided below deck, for example, inside the housing 14. WAM Fleet One ADE 33 and WAM Fleet One BDE 35 will be described in further detail in the below paragraphs.

Figure 3A:
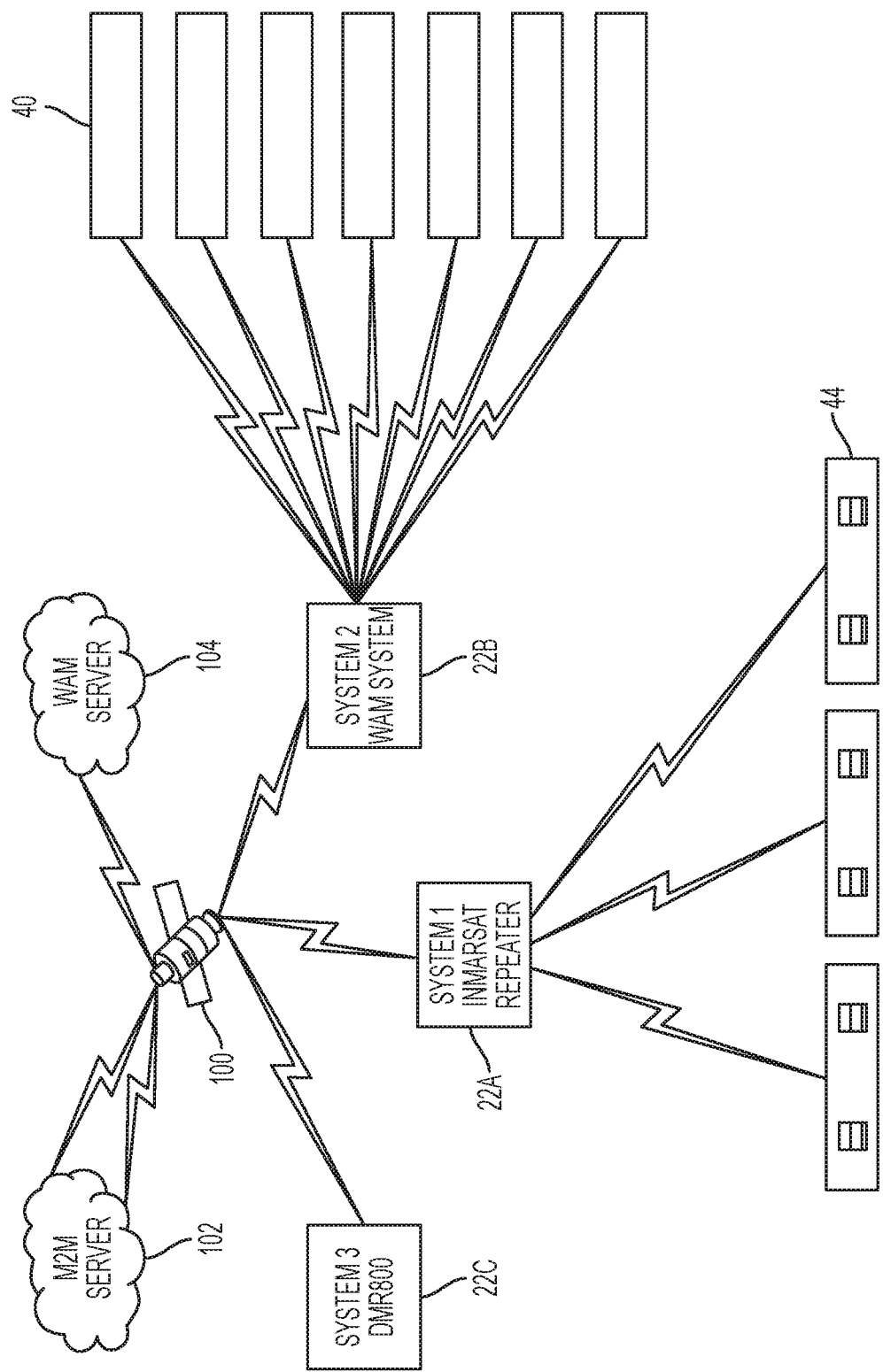
FIG. 3A depicts a communication diagram of the satellite repeater platform, according to an embodiment of the present disclosure.

FIG. 3A depicts a communication diagram of the satellite repeater 22, according to an embodiment of the present disclosure. The satellite repeater 22 includes a satellite repeater subsystem (e.g., Inmarsat Repeater) 22A configured to communicate with the one or more power packs 44 and with a machine-to-machine (M2M) server 102 via a satellite 100. The satellite repeater subsystem 22A is configured to relay data to/from the one or more power packs 44 and the M2M server 102 located on the ground.

The satellite repeater 22 can also include a Wireless Asset Management (WAM) subsystem 22B configured to communicate with one or more shipping containers 40 and a WAM server 104 via the satellite 100. The satellite repeater subsystem 22B is configured to relay data to/from the one or more shipping containers 40 and the WAM server 104 located on the ground. The satellite repeater subsystem 22B is configured to monitor operational parameters on the one or more shipping containers 40.

The satellite repeater 22 can further include a M2M (e.g., SkyWave DMR800) satellite monitoring subsystem 22C. The satellite monitoring subsystem 22C is configured to communicate with M2M server 102 via the satellite 100. The satellite monitoring subsystem 22C is configured to monitor DC system voltage, fire suppression system, position, course, speed, and to generate alerts. In an embodiment, the satellite monitoring subsystem 22C is further configured to communicate data to/from the M2M server 102 via satellite 100 using the iSat Data service. In an embodiment, the satellite monitoring subsystem 22C is further configured to send a status report periodically (e.g., every 12 hours) or on-demand when polled, and to send alerts immediately upon detection of malfunction or out-of-range parameters.

Figure 3B:
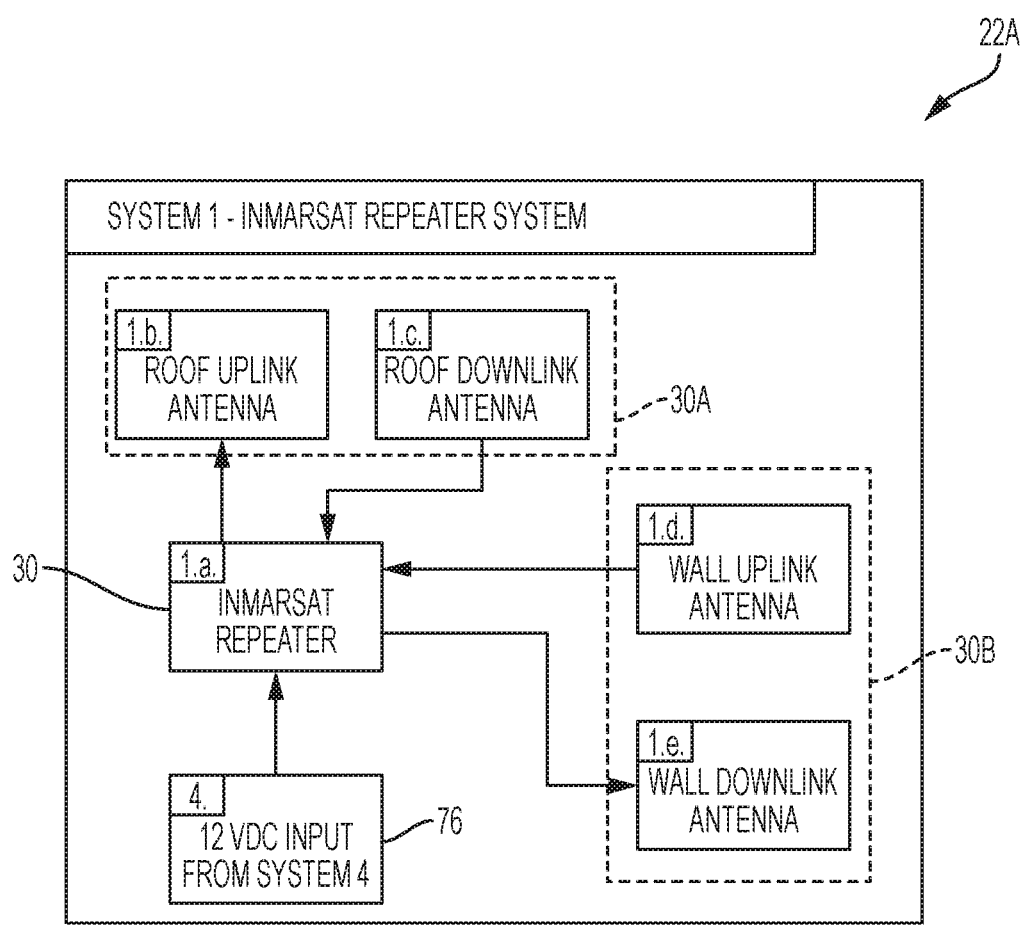
FIG. 3B is an electrical diagram of components of a satellite repeater subsystem of the satellite repeater platform, according to an embodiment of the present disclosure.

FIG. 3B is an electrical diagram of components of the satellite repeater subsystem 22A, according to an embodiment of the present disclosure. In an embodiment, the satellite repeater subsystem 22A includes a satellite communication system 30 such as Universal Repeater SATMAX 1.1, by Universal Repeater. The satellite repeater subsystem 22A further includes an outdoor satellite antenna (satellite uplink/downlink "roof" antenna) 30A and an indoor antenna (wall uplink/downlink antenna) 30B. The outdoor satellite antenna 30A and the indoor antenna 30B are connected to the satellite communication system 30. In an embodiment, the satellite communication system 30 is configured to send or receive a signal from the satellite 100 via the uplink/downlink outdoor antenna 30A, and to send or receive a signal from one or more components on the vessel (e.g., one or more power packs 44) via indoor antenna 30B. The outdoor satellite antenna 30A is configured for uplink and downlink communication data with the satellite 100. The indoor antenna 30B is configured for data communication with one or more components (e.g., the power packs 44) on the same vessel as the indoor antenna 30B. For example, the indoor antenna 30B can be configured for communication with one or more power packs 44 that are provided on the vessel. The indoor antenna 30B can be used to receive monitoring or sensor data (e.g., voltage data and/or power data of the power packs 44, etc.) from the one or more power packs 44 and provide the monitoring data (e.g., voltage data and/or power data of the power packs 44, etc.) to the satellite communication system 30. The monitoring data can include monitoring voltage, current, and/or power output data from the one or more power packs 44. The indoor antenna 30B can also be used to send control data from the satellite communication system 30 to the one or more power packs 44 to control a voltage, current, and/or power output of the one or more power packs 44.

Figure 3C:
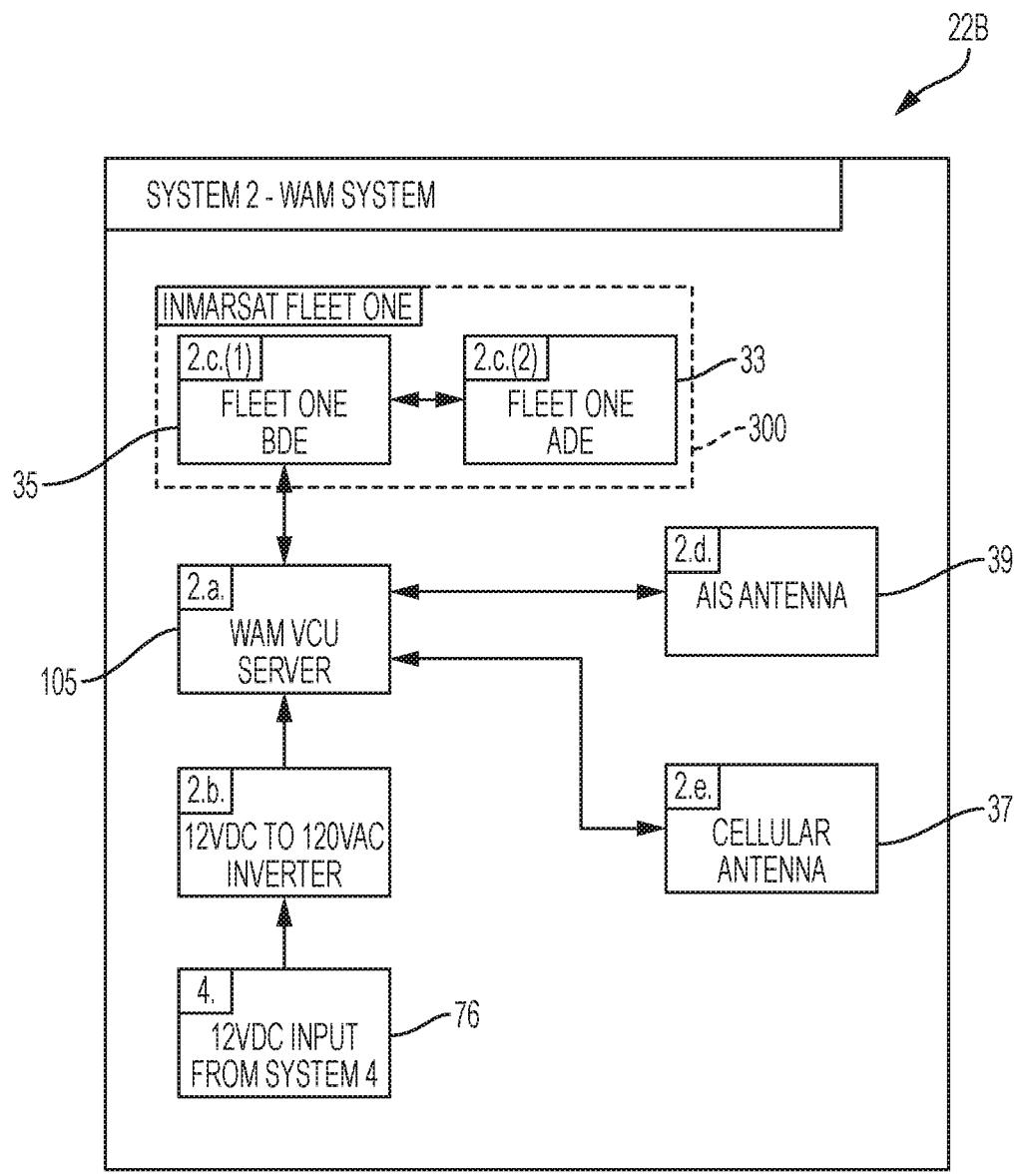
FIG. 3C is an electrical diagram of components of a WAM subsystem of the satellite repeater platform, according to an embodiment of the present disclosure.

FIG. 3C is an electrical diagram of components of the WAM subsystem 22B, according to an embodiment of the present disclosure. The WAM subsystem 22B includes a FleetOne Inmarsat satellite communication system 300. FleetOne Inmarsat satellite communication system 300 includes Fleet One Above Deck Equipment (ADE) 33 (e.g., COBHAM SAILOR antenna) and Fleet One Below Deck Equipment (BDE) 35 (e.g., COBHAM SAILOR terminal). WAM Fleet One ADE 33 is positioned above deck, for example, on the top wall of the housing 14. Fleet One BDE 35 is provided below deck, for example, inside the housing 14. The WAM subsystem 22B also includes a cellular directional antenna 37 (e.g., Cellular Yagi Antenna from L-COM corporation), also shown in FIGS. 2A and 2B, for communication with on-shore communication. In an embodiment, the cellular antenna 37 is mounted to the exterior wall of the housing 14. The cellular antenna 37 can be used as a mini-cellular tower when the vessel is out of range of a land based cellular tower farther from shore (e.g., greater than about 20 miles from the shore). When close to shore (e.g., less than about 20 miles from shore) the refrigerated containers 44 communicate with the WAM shore server directly using the land based cellular network. However, when the refrigerated containers 44 are farther from the shore (e.g., at a distance greater than about 20 miles from the shore), the refrigerated containers 44 communicate with the WAM subsystem 22B via the cellular antenna 37. The WAM subsystem 22B can further include automatic identification system (AIS) antenna 39. AIS antenna 39 can be used to receive position data from the vessel in order to enable the on board WAM sever to act as a cellular tower for the purpose of communicating data to/from the refrigerated containers 44. This is to meet the FCC requirement which prohibits the vessel based cellular from operating within range of the terrestrial cellular network to prevent interference. In an embodiment, the WAM subsystem 22B can be powered by the power supply 23, e.g., solar panels 24. For example, the solar panels 24 can be used to charge a battery which in turn can be used to power the WAM subsystem 22B. Embodiments can also include a charge controller and/or an emergency charger for initial charge in the event of failure of the power supply 23. The satellite repeater subsystem 22B includes WAM Vessel Connect Unit (VCU) server 105. The WAM VCU server 105 is in communication with the FleetOne Inmarsat satellite communication system 300 and with MS antenna 39 and cellular antenna 37. The WAM subsystem 22B uses the FleetOne Inmarsat satellite communication system 300 to communicate with the satellite 100 (shown in FIG. 3A) when the ship or vessel carrying the satellite repeater platform 20 is at a distance from the shore greater than about 15 to 20 miles. The satellite 100 relays the communication to WAM server 104 when the ship or vessel carrying the satellite repeater platform 20 is at a distance from the shore greater than about 15 to 20 miles. However, the individual refrigerated containers 44 communicate with the shore WAM server 104 over the terrestrial cellular network, when the ship or vessel carrying the satellite repeater platform 20 is at a distance from the shore less than about 15 to 20 miles. The distance up to 15 to 20 miles range is the typical transmission distance range of terrestrial cellular towers.

Figure 3D:
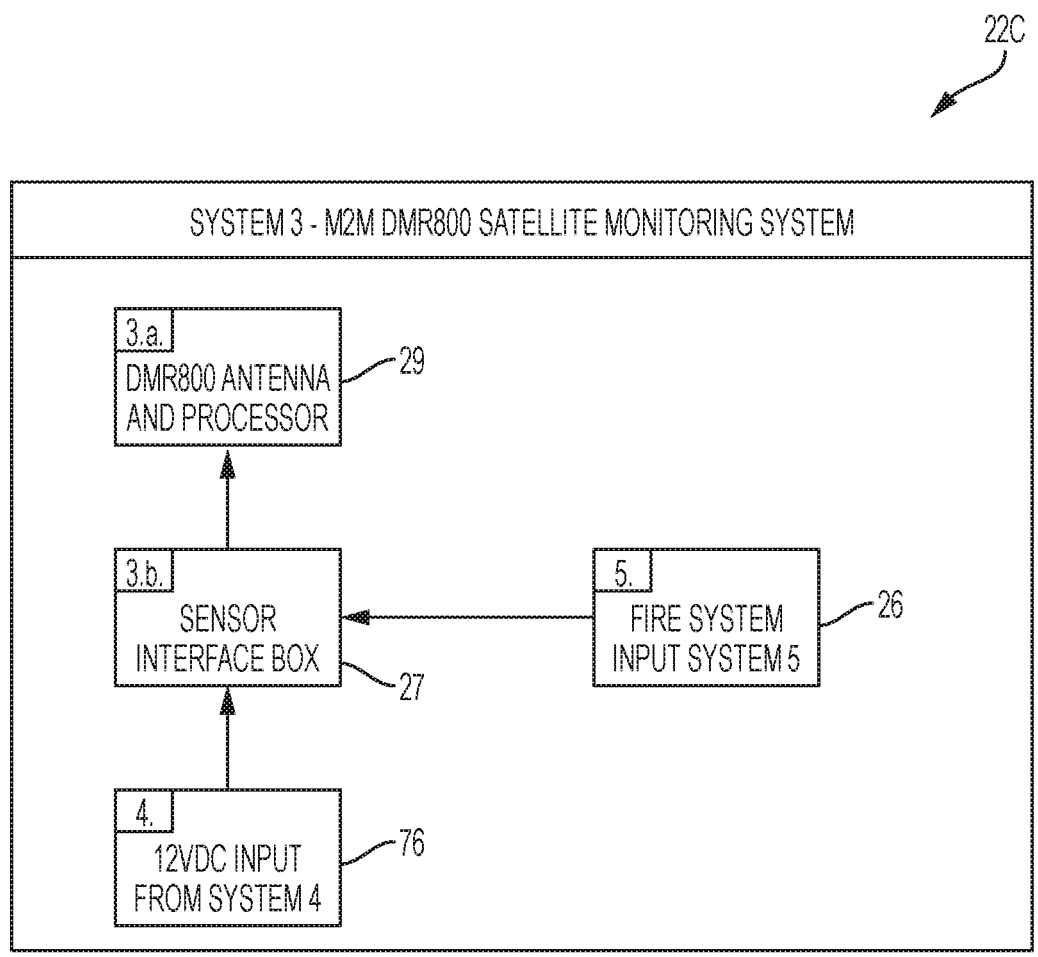
FIG. 3D is an electrical diagram of components of M2M satellite monitoring subsystem of the satellite repeater platform, according to an embodiment of the present disclosure.

FIG. 3D is an electrical diagram of components of M2M satellite monitoring subsystem 22C, according to an embodiment of the present disclosure. The satellite monitoring subsystem 22C is configured to communicate with M2M server 102 via the satellite 100. The satellite monitoring subsystem 22C is configured to monitor DC system voltage, fire suppression system, position, course, speed, and to generate alerts. According to an embodiment, the satellite monitoring subsystem 22C includes fire system 26 (also shown in FIG. 2A), sensor interface 27 and antenna and processing system (e.g., SkyWave DMR800 processor) 29. The fire system 26 (including fire sensors and/or temperature sensors, etc.) is connected to the sensor interface 27 which communicates sensor data to the antenna and processing system 29. The antenna and processing system 29 is in turn configured to communicate with remote land-based M2M server 102 via the satellite 100.

Figure 3E:
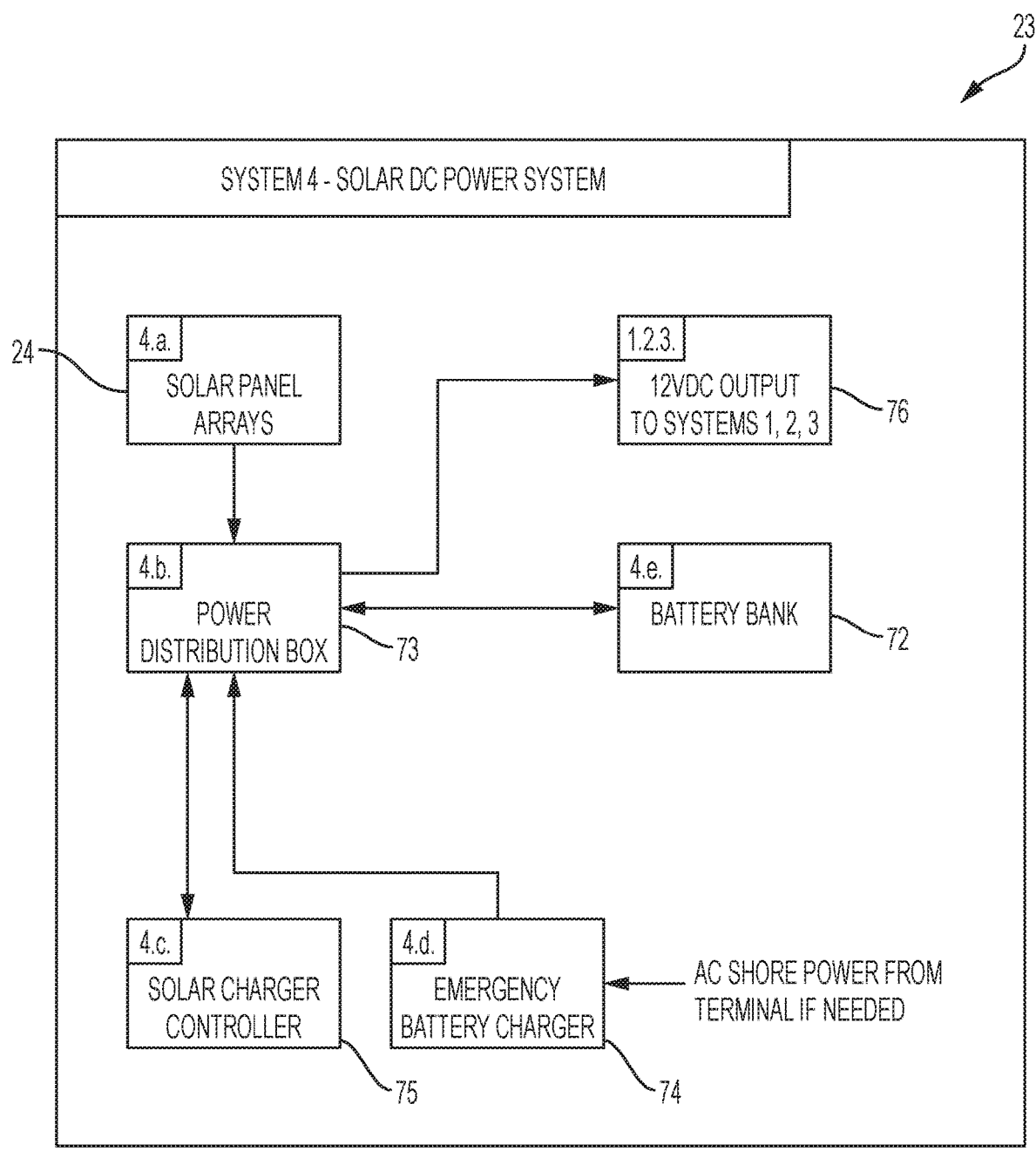
FIG. 3E is an electrical diagram of components of a power supply (solar DC power system) for powering a satellite repeater housed inside the satellite repeater platform, according to an embodiment of the present disclosure.

FIG. 3E is an electrical diagram of components of the power supply 23 for powering the satellite repeater 22, according to an embodiment of the present disclosure. The power supply 23 includes solar panel arrays 24, battery bank 72, power distribution box 73, emergency battery charger 74, and solar charger controller 75. Circuit breaker protection (not shown) can also be provided to interrupt current flow to protect the electrical circuitry from damage that can be caused by excess current typically resulting from an overload or short circuit. Solar panels 24 are used to charge the battery bank 72 via the power distribution box 73. The power generated by the battery bank 72 and/or the solar panel arrays 24 can be output as a DC voltage out 76 to power various systems of the satellite repeater platform 22 including subsystems 22A, 22B, and 22C (see, FIGS. 3B, 3C, 3D). In case of emergency when the solar panel arrays 24 do not provide sufficient electrical power to charge the battery bank 72, emergency battery charger 74 can be used to charge the battery bank 72. Solar charger controller 75 is used to monitor and/or control the charge of the battery bank 72. In addition to the above electrical equipment, thermostat controlled solar powered ventilation 28 (shown in FIGS. 2A and 2B) is provided to housing 14 containing the above electrical equipment to exhaust heat generated by various components of the electrical equipment.

In an embodiment, the satellite repeater platform 20 can be configured for North-South operation by proper orientation of the solar panels. However, the orientation can be changed in accordance with a desired operation or mission. For example, this can be done by an appropriate orientation of the solar panels 24 so they are exposed to solar light during the movement of the vessel at sea. In an embodiment, all or parts of the rack 10 can be painted with a bright color (e.g., yellow or orange) to make it stand out among the shipping containers.

The satellite repeater platform 20 can be loaded onto the vessel or barge in the same or similar fashion as any other shipping container. According to embodiments, the satellite repeater platform 20 can be loaded in a specific location to facilitate its operation. The satellite repeater platform 20 can be off loaded with the rest of the shipping containers to be inspected. Similar to other shipping containers, the satellite repeater platform 20 is placed on top of a shipping container with similar dimensions and held in place by its own weight and cell guides or guide rails and pins, etc.

Figure 4A:
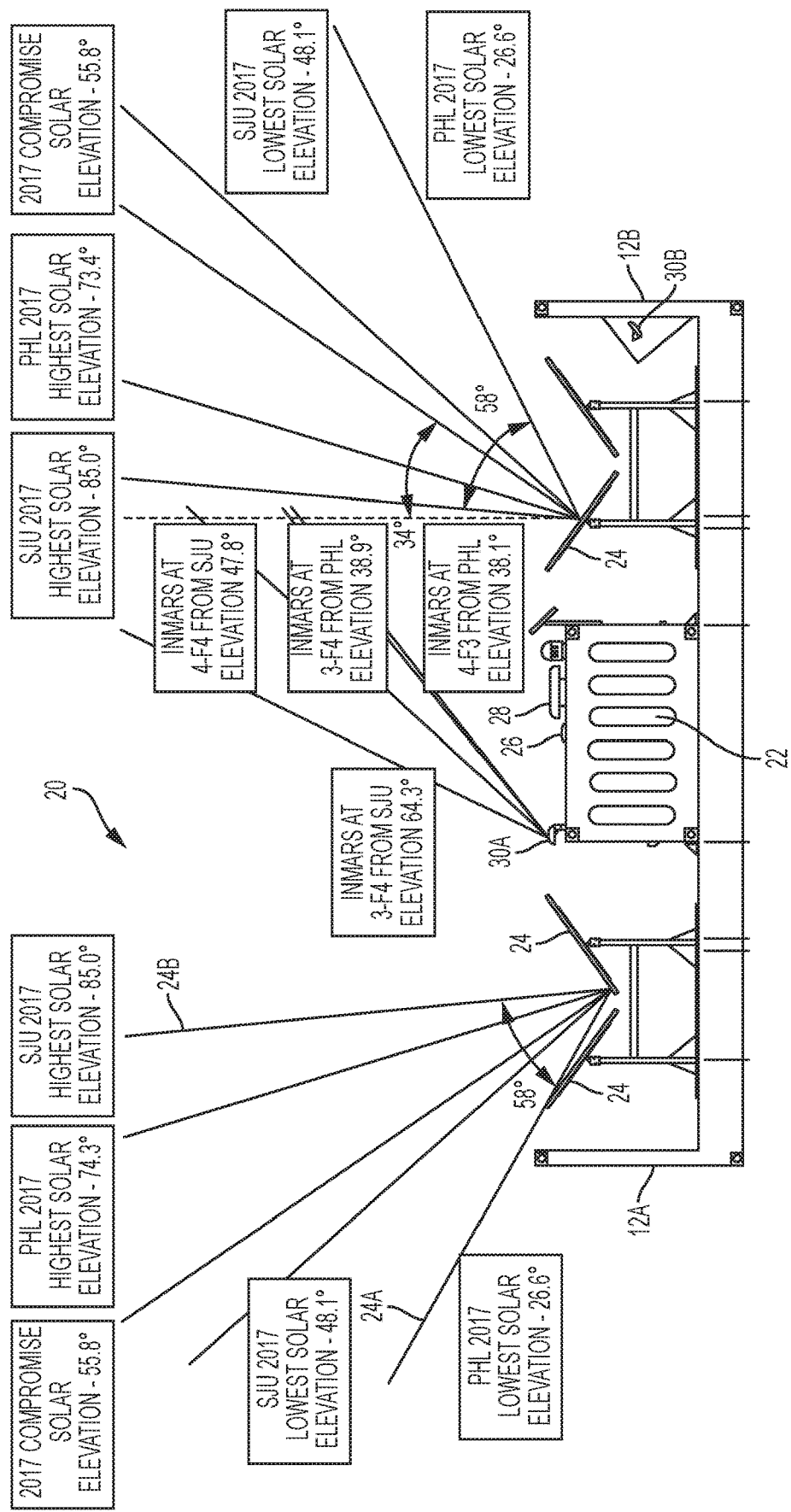
FIG. 4A shows various angular orientations or elevations of solar panels, and resulting direction of sight of a satellite antenna, according to an embodiment of the present disclosure.

FIG. 4A shows various angular orientations or elevations of the solar panels 24 and the direction of sight of the outdoor satellite antenna 30A, according to an embodiment of the present disclosure. As shown in FIG. 4A, in an embodiment, the solar panels 24 can be positioned so that there will be no North/South blockage (on average) at the lowest solar angle, i.e., winter solstice at the most northerly expected position—PHL, depicted as orientation line 24A. The satellite antenna 30A is also mounted so as to have a clear view of the satellites at most positions of the ship, including at the most northerly expected position as well as the PHL (Philadelphia, Pa.) position and the SJU (San Juan, PR) highest solar elevation, depicted as line 24B. Furthermore, FIG. 4A shows the elevations of the Inmarsat antenna 30A in PHL and SJU. The left side of FIG. 4A shows that even at winter solstice in PHL, the solar panel 24 is illuminated by the sun, shown as if the ship were going northbound. According to an embodiment, the angular coverage of the outdoor antenna 30A is about 180 degrees, thus enabling direct line of sight and communication with a satellite. FIG. 4A further depicts the position of the indoor antenna 30B. For example, in this embodiment, the indoor antenna 30B can be mounted to second end wall 12B within the confines of the housing rack 10. An opening can be provided within the end wall 12A onto which the indoor antenna 30B is mounted to allow unobstructed communication.

Figure 4B:
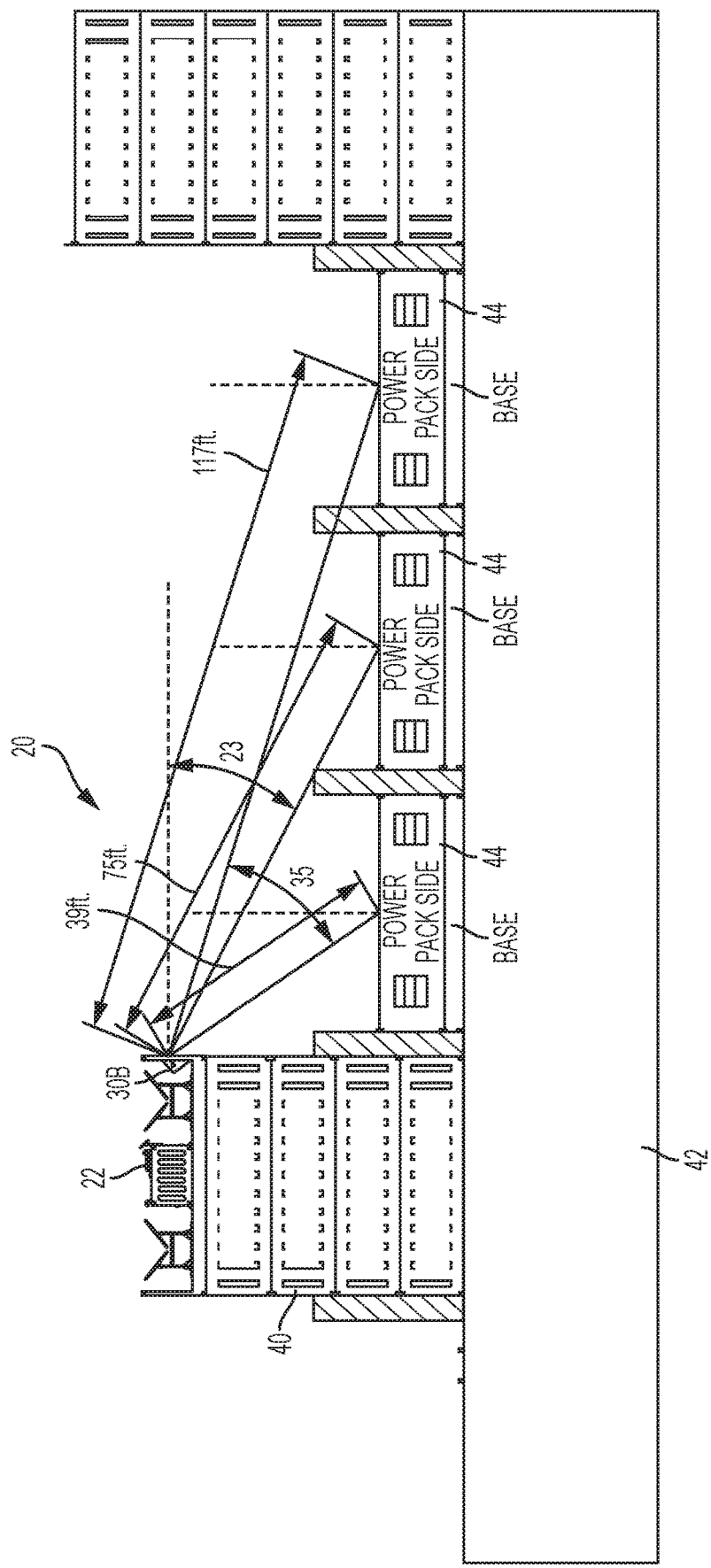
FIG. 4B shows the angular coverage of an indoor antenna, according to an embodiment of the present disclosure.

As shown in FIG. 4A, in an embodiment, the solar panels 24, the antennae 30A and 30B, the device for monitoring battery voltage and fire system 26, the solar powered ventilator 28, etc. stay within the bounds of the rack 10 so the satellite repeater system 20 can be safely lifted on and off a vessel with a spreader. FIG. 4B shows the angular coverage of the indoor antenna 30B, according to an embodiment of the present disclosure. When the satellite repeater platform 20 is placed at "level 5," e.g., on top of four shipping containers 40 on the ship or barge 42, the indoor antenna 30B allows the satellite repeater 22 to communicate with a plurality of power packs 44 located on the ship or barge 42. The coverage angle of the indoor antenna 30B can be varied to cover a plurality of power packs 44. In addition, the angular elevation of indoor antenna 30B can also be adjusted to reach or cover a specific one or more power packs 44 as desired. For example, as shown in FIG. 4B, the angular range of the indoor antenna 30B can be set to be about 35 degrees taking into account a distance between the indoor antenna 30B and the position of the plurality of power packs 44. In this example, the distance between the indoor antenna 30B and the closest power pack 44 is about 39 feet; the distance between the indoor antenna 30B and the middle power pack 44 is about 75 feet; and the distance between the indoor antenna 30B and the farthest power pack 44 is about 117 feet. For the sake of clarity, the shipping containers that would be located between the viewer and the satellite repeater platform 20 and the power packs 44 are not shown in FIG. 4B so as to show the relative distance between the indoor antenna 30B and the plurality of power packs 44. In addition, the angular range of the indoor antenna 30B is also shown, which provides signal coverage of the plurality of power packs 44, from the closest power pack 44 to the farthest power pack 44.

Figure 5A:
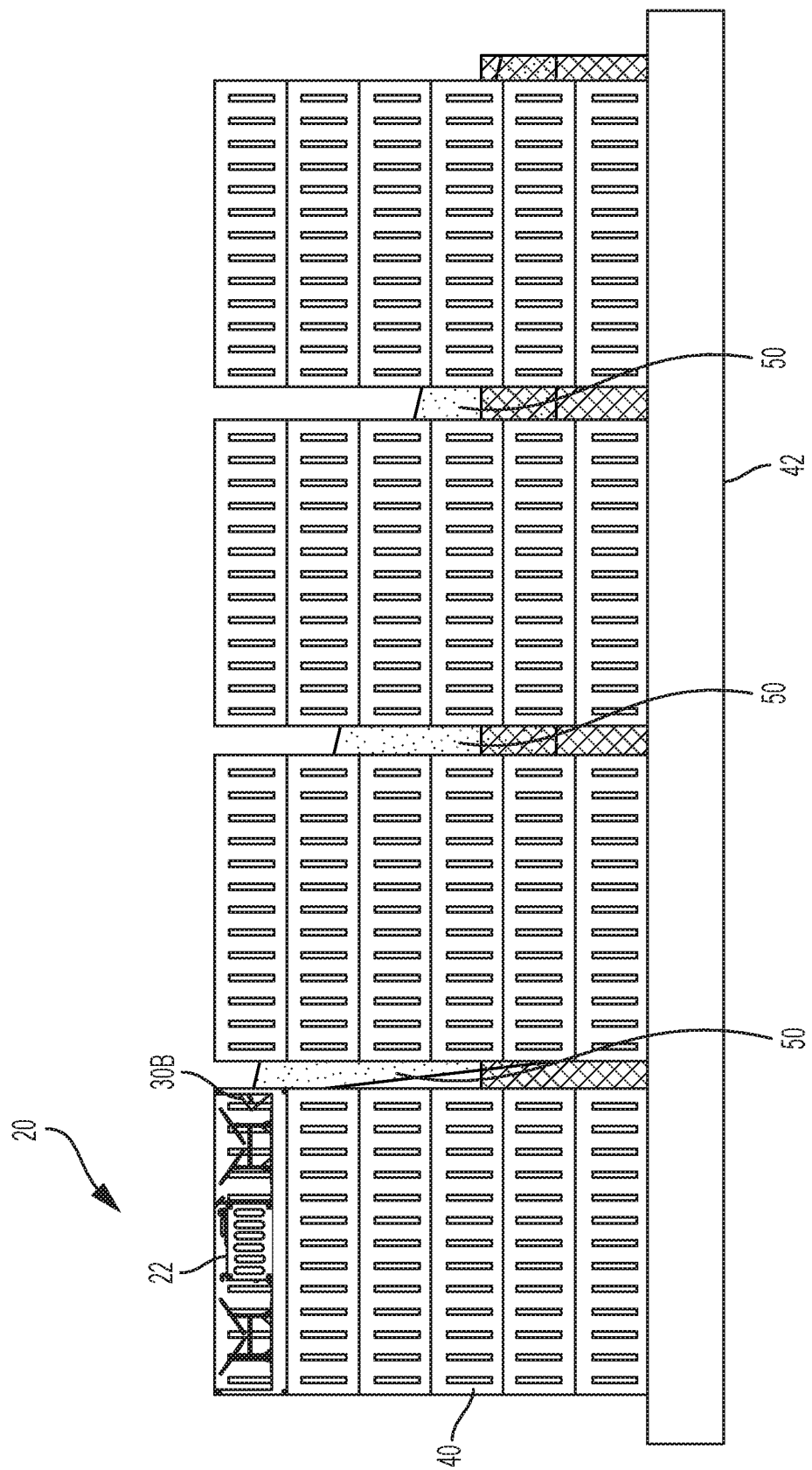
FIG. 5A is a lateral view of a plurality of shipping containers placed on top of a vessel or barge and the satellite repeater platform placed on top of a stack of five shipping containers, showing an angular coverage of the indoor antenna, according to an embodiment of the present disclosure.

FIG. 5A is a lateral view of a plurality of shipping containers 40 placed on top of a ship or barge 42 and the satellite repeater platform 20 placed on top of a stack of five shipping containers 40. FIG. 5A also shows the angular coverage 50 of the indoor antenna 30B, according to an embodiment of the present disclosure. The angular coverage 50 of the indoor antenna 30B is such that indoor antenna 30B is configured to send and receive a signal from the closest power pack 44 to the farthest power pack 44 relative to the position of the indoor antenna 30B. In an embodiment, the angular coverage of the indoor antenna 30B is greater than approximately 30 degrees. As it can be understood, the angular coverage of the indoor antenna 30B can be adjusted to cover the plurality of power packs 44 depending, for example, on the height position of the satellite repeater platform 20. As shown in FIG. 5A, the satellite repeater platform 20 is positioned on top of a column stack of shipping containers 40. In an embodiment, the transmitted signal from the indoor antenna 30B in the satellite repeater platform 20 is transmitted within a steel canyon formed between two opposite stacks of shipping containers (e.g., between the opposed walls of two adjacent rows of shipping containers) to reach the various power packs placed between the walls on the deck of the ship or barge 42. Only one wall is shown in FIG. 5A as the other wall is located directly behind the wall that is shown. The angular coverage 50 of the transmitted signal is shown top to bottom in the lateral plane.

Figure 5B:
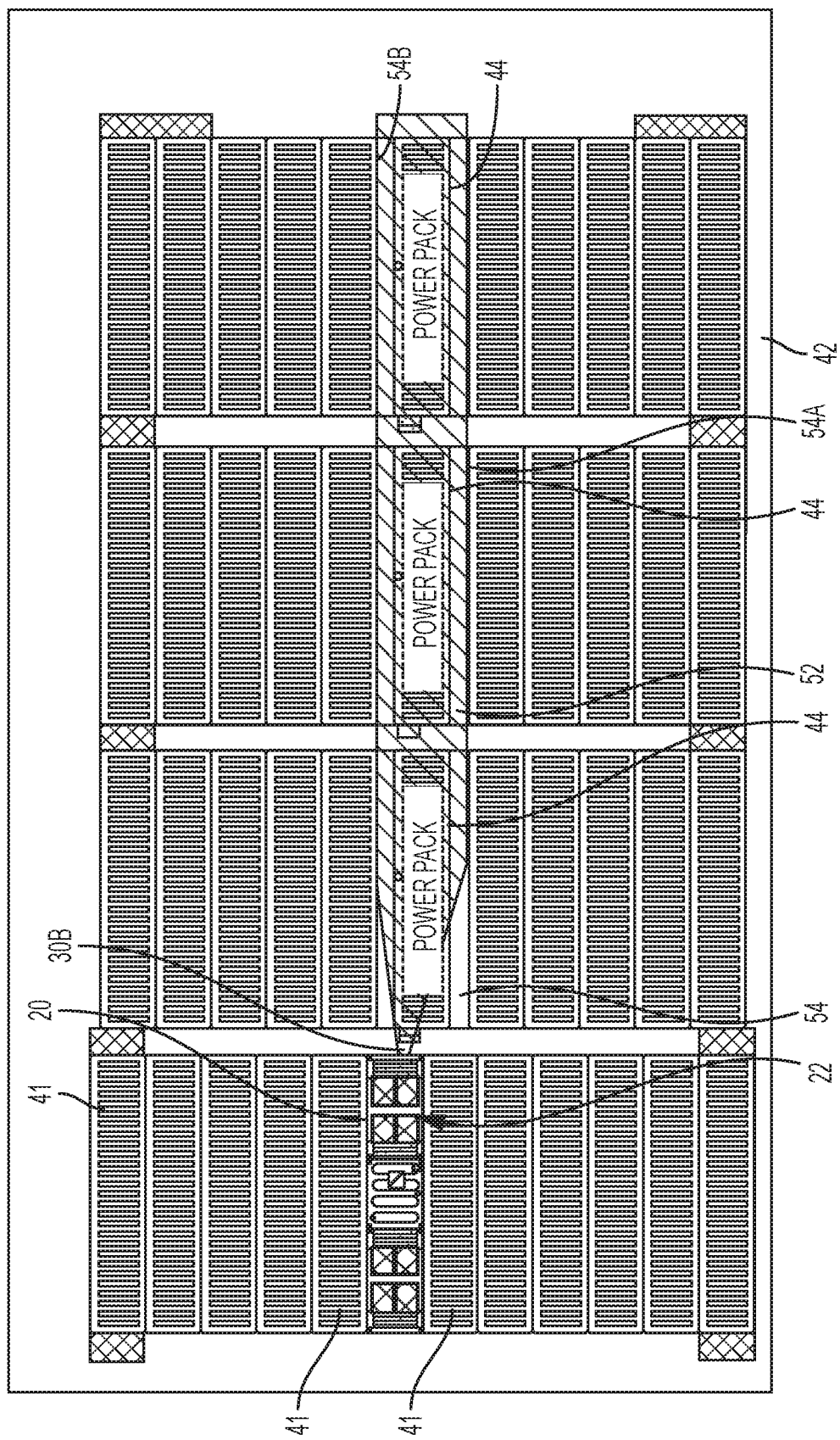
FIG. 5B is a top view of the plurality of shipping containers placed on top of the vessel or barge of FIG. 5A, where the satellite repeater platform is placed on top of a stack of shipping containers, showing an angular coverage of the indoor antenna, according to an embodiment of the present disclosure.

FIG. 5B is top view of the plurality of shipping containers 40 placed on top of the ship or barge 42. FIG. 5B also depicts the satellite repeater platform 20 placed on top of the stack of shipping containers 40 (located underneath the satellite repeater platform 20 and hence not visible in FIG. 5B). FIG. 5B further depicts the angular coverage 52 of the indoor antenna 30B, according to an embodiment of the present disclosure. In an embodiment, the angular coverage 52 is limited by the width of the canyon between adjacent rows of shipping containers. In an embodiment, the angular coverage can be estimated based on the width of the canyon (e.g., about 10 feet) and the distance between the indoor antenna 30B to a half-length of the closest container 40 (e.g., about 20 feet). For example, the tangent of half of the angular coverage is equal to half of the width (about 5 feet) divided by half of the length of the container (about 20 feet). This provides an angular coverage of the indoor antenna greater than or approximately equal to 30 degrees.

According to the embodiment shown, the satellite repeater platform 20 is positioned on top of a column stack of shipping containers 40. Also in the embodiment shown, the satellite repeater platform 20 is surrounded laterally on every side, except the end having the indoor antenna 30B, by shipping containers 40. In an embodiment, the transmitted signal from the indoor antenna 30B is transmitted within a steel canyon 54 formed between two rows of walls 54A and 54B of shipping containers 40 to reach the various power packs 44 placed between the rows of walls 54A and 54B on the deck of the ship or barge 42. The angular coverage 52 of the transmitted signal can be confined laterally by the walls 54A and 54B within the steel canyon 54. However, the transmitted signal can propagate lengthwise downwardly to a desired distance to reach the various power packs 44.

Figure 6:
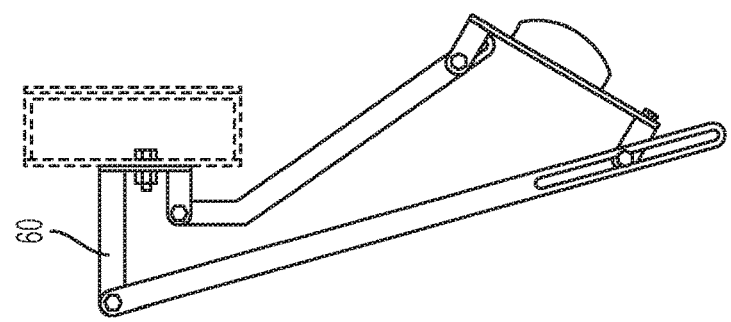
FIG. 6 is a side view of a mounting arm for mounting an indoor antenna shown in a variety of angulations, according to an embodiment of the present disclosure.
Figure 6:
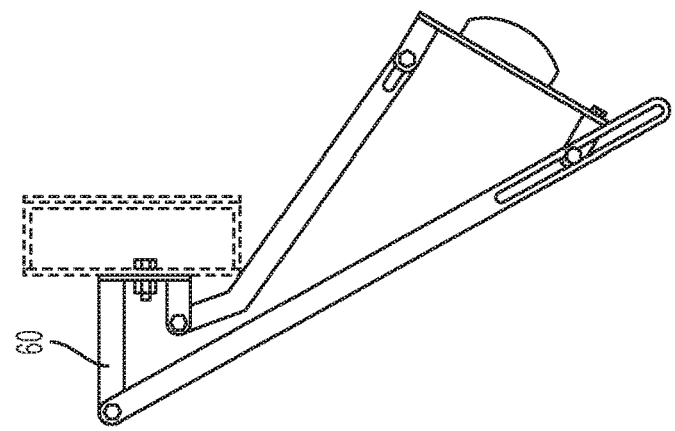
Figure 6:
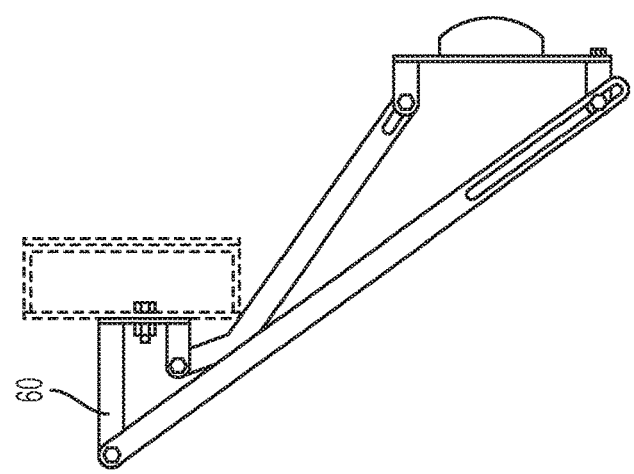
Figure 6:
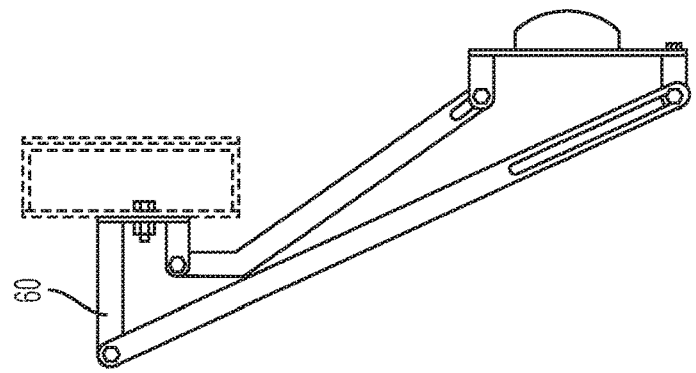

Referring to FIG. 6, the indoor antenna 30B can be mounted to the first end wall 12A or the second end wall 12B, or both, using a mounting arm 60. The mounting arm 60 can be arranged to adjust an orientation of the indoor antenna 30B to transmit and receive data from the one or more power packs. FIG. 6 is a side view of the mounting arm 60 for mounting the indoor antenna 30B, according to an embodiment of the present disclosure. FIG. 6 shows the mounting arm 60 at a plurality of different angular orientations. As illustrated in FIG. 6, the mounting arm 60 is configured and arranged for angular movement to orient the indoor antenna 30B. The upper left configuration in FIG. 6 shows a substantially vertical orientation of the mounting arm 60 to achieve an inclination of the indoor antenna 30B of 0 degree. The upper right configuration in FIG. 6 shows an orientation of the mounting arm 60 to achieve an inclination of the indoor antenna 30B of about 23 degrees. The lower left configuration in FIG. 6 shows an orientation of the mounting arm 60 to achieve an inclination of the indoor antenna 30B of about 30 degrees. The lower right configuration in FIG. 6 shows an orientation of the mounting arm 60 to achieve an inclination of the indoor antenna 30B of about 35 degrees. The bottom configuration in FIG. 6 shows an orientation of the mounting arm 60 to achieve an inclination of the indoor antenna 30B of about 90 degrees. The inclination is an angular orientation defined relative to the horizontal line.

Figure 7:
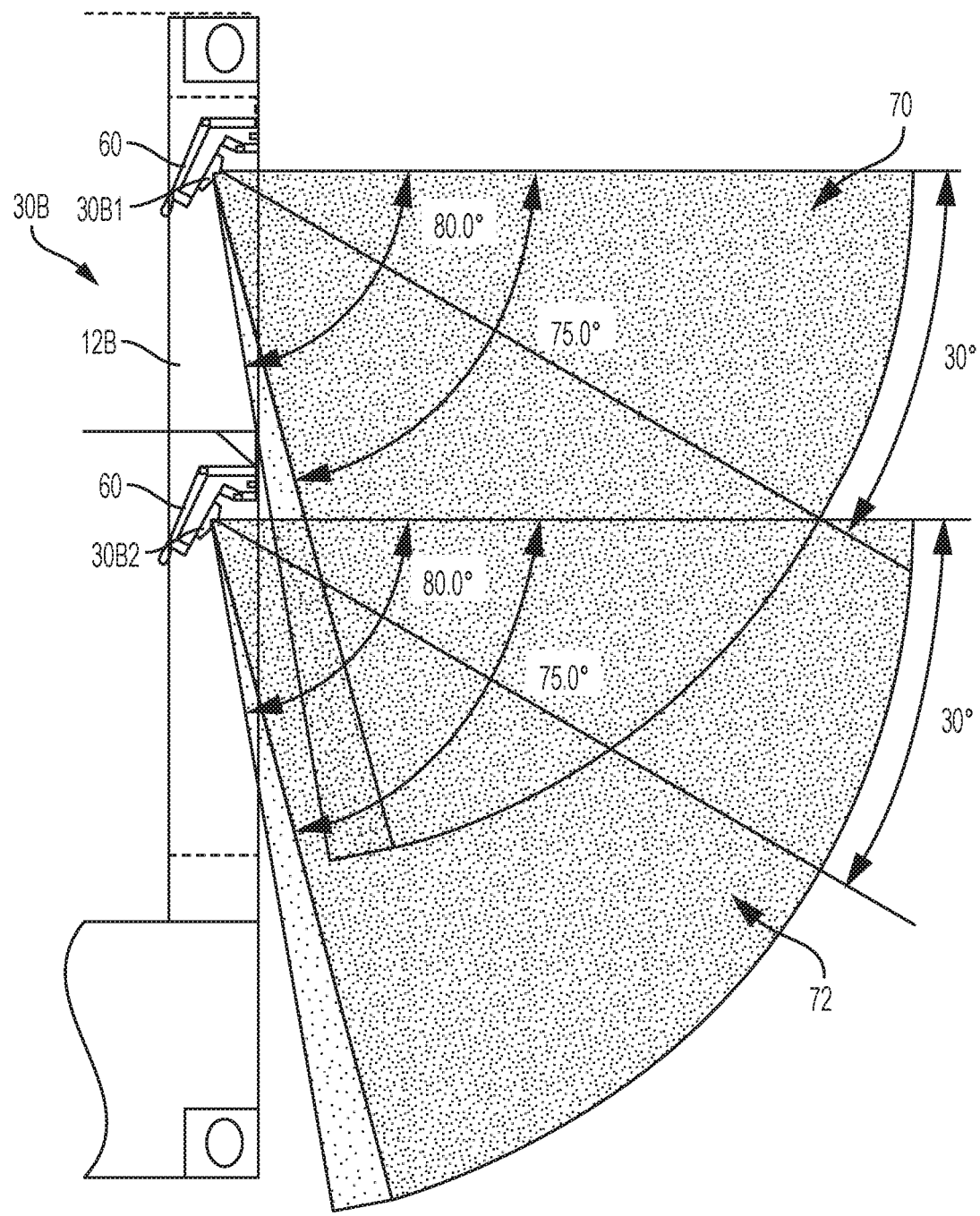
FIG. 7 depicts the indoor antenna mounted to a wall of a rack of the satellite repeater platform using the mounting arm shown in FIG. 6, according to an embodiment of the present disclosure.

FIG. 7 depicts an embodiment of the indoor antenna 30B mounted to wall 12B using the mounting arm 60, according to an embodiment of the present disclosure. The mounting arm 60 is configured and arranged to enable adjusting of the angular elevation of the indoor antenna 30B to reach or cover a specific one or more power packs 44 as desired. In this embodiment, the indoor antenna 30B comprises two antennae 30B1 and 30B2. A first indoor antenna (the upper antenna) 30B1 is an uplink indoor antenna configured to receive a signal in a broad angular coverage 70 (e.g., 80 degrees). A second indoor antenna (the lower antenna) 30B2 is a downlink indoor antenna configured to transmit a signal in a broad angular coverage 72 (e.g., 80 degrees). As shown in FIG. 7, the inclination of the first and second indoor antennae 30B1 and 30B2 is about 30 degrees from the horizontal line.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure can be modified or varied, without departing from the invention, as appreciated by those skilled in the art in light of the above teachings. It is therefore to be understood that, within the scope of the claims and their equivalents, the invention can be practiced otherwise than as specifically described. For example, it is to be understood that the present disclosure contemplates that, to the extent possible, one or more features of any embodiment can be combined with one or more features of any other embodiment.

The invention claimed is:

1. A satellite repeater system for a ship or barge, comprising:
    a rack having dimensions that are substantially equal to a standard shipping container; and
    a satellite communication system located on the rack, the satellite communication system comprising:
    a first antenna located on the rack, the first antenna being configured to send and receive data from a communication satellite; and
    a second antenna located on the rack, the second antenna being configured to send and receive data from one or more electronic components located on the ship or barge remotely from the second antenna,
    wherein the satellite communication system is configured as a communication relay to relay data from the one or more electronic components to the satellite and from the satellite to the one or more electronic components.

2. The satellite repeater system according to claim 1, wherein the rack has a length of about 40 feet, a width of about 8 feet, and a height of about 9.5 feet.

3. The satellite repeater system according to claim 1, wherein the one or more electronic components located on the ship or barge comprises a power pack configured to provide electric power to one or more shipping containers on the ship or barge, wherein the second antenna has an angular coverage area that covers the power pack.

4. The satellite repeater system according to claim 1, wherein the one or more electronic components located on the ship or barge comprises sensors configured to monitor physical parameters in one or more shipping containers.

5. The satellite repeater system according to claim 1, wherein the rack comprises first and second end walls, and wherein the second antenna is mounted to the first end wall or the second end wall.

6. The satellite repeater system according to claim 5, further comprising a mounting arm mounting the second antenna to the first end wall or the second end wall, wherein the mounting arm is configured to adjust an orientation of the second antenna to transmit and receive data from the one or more electronic components.

7. The satellite repeater system according to claim 1, wherein the satellite communication system further comprises a SATMAX system configured to receive from and transmit a signal to the communication satellite via the first antenna and transmit and receive a signal from the one or more electronic components via the second antenna.

8. The satellite repeater system according to claim 1, further comprising a power supply configured to supply power to the satellite communication system, wherein the power supply comprises one or more solar panels.

9. The satellite repeater system according to claim 8, wherein the power supply further comprises chargeable electrical batteries configured to be charged by electrical power supplied by the one or more solar panels.

10. The satellite repeater system according to claim 1, further comprising a Wireless Asset Management (WAM) subsystem, wherein the WAM subsystem further comprises a cellular antenna configured to communicate with individual refrigerated containers on board the vessel when the vessel is at a distance more than approximately 20 miles from the shore.

11. The satellite repeater system according to claim 1, further comprising a cellular directional antenna configured for cellular communication.

12. The satellite repeater system according to claim 1, wherein the satellite repeater is configured to be positioned on top of a column stack of shipping containers so as to enable the second antenna to send and receive data from the one or more electronic components located on the ship or barge.

13. A ship or barge, comprising:
    a plurality of shipping containers located on the ship or barge;
    at least one power pack associated with one or more of the plurality of shipping containers; and
    a satellite repeater system located on the ship or barge, the satellite repeater system comprising:
    a first antenna being configured to send and receive data from a communication satellite; and
    a second antenna being configured to send and receive data from the at least one power pack,
    wherein the at least one power pack is placed between rows of the plurality of shipping containers on the ship or barge, the one or more power packs being configured to provide power to the one or more shipping containers or monitor parameters in the one or more shipping containers, or both.

14. The ship or barge according to claim 13, wherein the satellite repeater system is located on a rack having dimensions that are substantially equal to the at least one shipping container located on the ship or barge.

15. The ship or barge according to claim 14, wherein the rack has a length of about 40 feet, a width of about 8 feet, and a height of about 9.5 feet.

16. The ship or barge according to claim 13, wherein the plurality of shipping containers includes a first row of shipping containers and a second row of shipping containers, and the second antenna of the satellite repeater system is configured to send and receive data from the at least one power pack through a passage defined between the first and second rows of shipping containers.

17. The ship or barge according to claim 16, wherein the second antenna has an angular coverage area that is greater than approximately 30 degrees.

18. The ship or barge according to claim 13, wherein the satellite repeater system further comprises a power supply configured to supply power to the satellite communication system, wherein the power supply comprises one or more solar panels and chargeable electrical batteries configured to be charged by electrical power supplied by the one or more solar panels.

19. A method of communicating between a satellite and one or more electrical components located on a ship or barge, the method comprising:
    transmitting data between a first antenna located on a rack having dimensions that are substantially equal to a standard shipping container and a communication satellite, the rack being located on a ship or barge;
    transmitting the data between a second antenna located on the rack and one or more electronic components located on the ship or barge remotely from the second antenna; and
    transmitting the data between the first antenna and the second antenna,
    wherein transmitting the data between the second antenna located on the rack and one or more electronic components located on the ship or barge comprises transmitting the data to one or more power packs placed between rows of shipping containers on the ship or barge, the one or more power packs being configured to provide power to the one or more shipping containers and/or monitor parameters in the one or more shipping containers.

20. The method according to claim 19, further comprising providing electric power to one or more shipping containers on the ship or barge, and monitoring physical parameters in one or more shipping containers located on the ship or barge.

* * * * *